(12) United States Patent
Huang et al.

(10) Patent No.: US 7,570,623 B2
(45) Date of Patent: Aug. 4, 2009

(54) METHOD AND APPARATUS FOR OPERATING A NODE IN A BEACON BASED AD HOC NETWORK

(75) Inventors: Jian Huang, Coral Springs, FL (US); Vernon Allen, Ft. Lauderdale, FL (US); Feng Niu, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 307 days.

(21) Appl. No.: 11/275,671

(22) Filed: Jan. 24, 2006

(65) Prior Publication Data
US 2007/0171843 A1    Jul. 26, 2007

(51) Int. Cl.
*H04Q 7/24* (2006.01)
(52) U.S. Cl. .................. 370/338; 455/41.2; 455/41.3
(58) Field of Classification Search ............ 455/41.2, 455/41.3; 370/338
See application file for complete search history.

(56) References Cited

U.S. PATENT DOCUMENTS

| 2003/0151513 | A1 | 8/2003 | Herrmann et al. |
| 2004/0179488 | A1* | 9/2004 | Kim et al. ................ 370/324 |
| 2005/0058084 | A1 | 3/2005 | Hester et al. |
| 2006/0133408 | A1* | 6/2006 | Nogueira-Nine et al. .... 370/447 |
| 2007/0207750 | A1* | 9/2007 | Brown et al. ............ 455/127.5 |

OTHER PUBLICATIONS

Lu et al., "Performance Evaluation of the IEEE 802.15.4 MAC for Low-Rate Low-Power Wireless Networks," Department of Electrical Engineering, University of Southern California, Los Angeles, CA, pp. 701-706, 2004.
Lee W. Young, "PCT International Search Report and Written Opinion," WIPO, ISA/US, Alexandria, Virginia, USA, Oct. 26, 2007.

* cited by examiner

*Primary Examiner*—Nick Corsaro
*Assistant Examiner*—Amanuel Lebassi

(57) ABSTRACT

During operation a node (500) that has associated with a network (100) will periodically broadcast a beacon (303) during a beacon interval as part of a superframe. The beacon will be periodically broadcast for a first period of time, based on a time it takes for nodes to associate with the network. After the first period of time has passed, the beacon will be switched off for a second period of time, after which, the beacon will again be periodically broadcast.

17 Claims, 4 Drawing Sheets

METHOD AND APPARATUS FOR OPERATING A NODE IN A BEACON BASED AD HOC NETWORK

FIELD OF THE INVENTION

The present invention relates generally to ad-hoc networks, and in particular, to a method and apparatus for operating a node within an ad-hoc network.

BACKGROUND OF THE INVENTION

In a beacon enabled ad-hoc sensor network, a network association is initiated with a node scanning the proximity and discovering beacons which serves as invitation to join the network. When a node completes the network association, it begins transmitting its own beacons as a means of time synchronization and as a signal of association invitation. However, the beacons may also interfere with new network associations. In fact, numerous simulations showed that the probability of forming a beacon enabled network successfully is much lower compared to a non-beacon enabled network especially under the constraint of a short frame length, i.e. active window-time. Therefore, a need exists for a method and apparatus for operating a node in a beacon-based ad-hoc network that reduces the interference that beacons cause to associating nodes.

BRIEF DESCRIPTION OF THE DRAWINGS

FIG. 5 is a block diagram of a node.

DETAILED DESCRIPTION OF THE DRAWINGS

In order to address the above-mentioned need, a node that has associated with a network will periodically broadcast a beacon during a beacon interval as part of a superframe. The beacon will be periodically broadcast for a first period of time, based on a time it takes for neighboring nodes to associate with the network. After the first period of time has passed, the beacon will be switched off for a second period of time, after which, the beacon will again be periodically broadcast.

Because the node will broadcast its beacon during the first period of time, nodes may associate with it. However, since the node will cease broadcasting its beacon during the second period of time, interference within the system is reduced, allowing other nodes to more efficiently associate with the network.

The present invention encompasses a method for controlling a beaconing node within communication system. The method comprises the steps of associating with a network, determining a first period of time to broadcast a beacon, where the first period of time is based upon a time it takes for a node to associate with the network, and broadcasting the beacon for the first period of time. The beacon broadcasts are ceased for a second period of time after the first period of time has passed and again periodically broadcast after the second period of time has passed.

The present invention additionally encompasses a method comprising the steps of associating with a network, and broadcasting a beacon for a first period of time, where the first period of time is based on a time it takes for a node to associate with the network. The beacon is not broadcast after the first period of time has passed, and again broadcast after a second period of time has passed.

The present invention encompasses an apparatus comprising a transmitter broadcasting a beacon for a first period of time, where the first period of time is based on a time it takes for a node to associate with the network, the transmitter ceasing broadcasting the beacon after the first period of time has passed and again broadcasting the beacon after a second period of time has passed.

Figure 1:
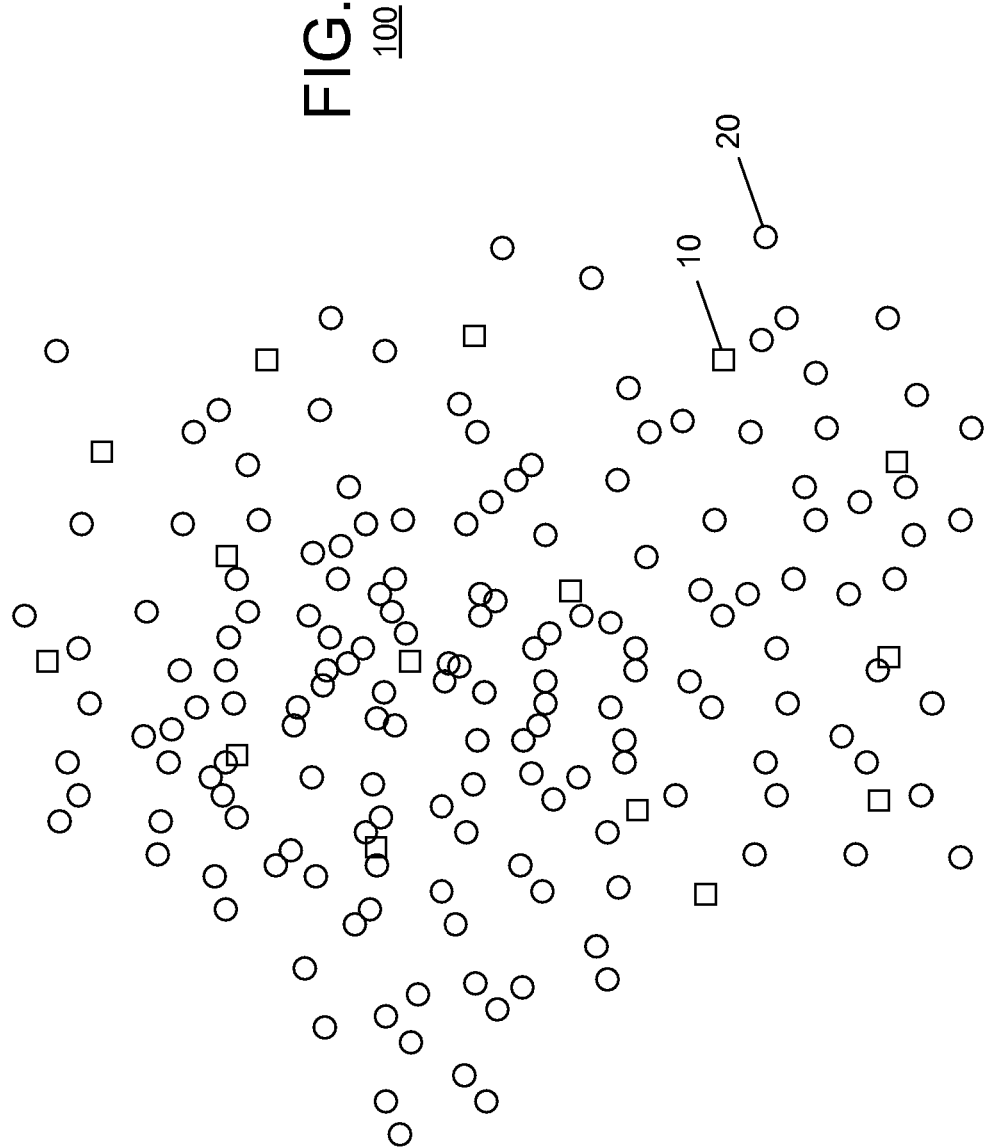
FIG. 1 block diagram of an ad-hoc communication system.

Turning now to the drawings, wherein like numerals designate like components, FIG. 1 illustrates communication system 100. Communication system 100 preferably utilizes a communication system protocol defined by 802.15.3 Wireless Personal Area Networks for High Data Rates or IEEE 802.15.4 Low Rate Wireless Personal Area Networks. However one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc. As shown, communication system 100 includes a number of nodes 20 and a number of coordinating nodes 10. Nodes 20 represent nodes that communicate with each other through synchronization provided by coordinating nodes 10. Nodes 20 can be transportable (mobile) or they can be fixed in a given place.

Figure 2:
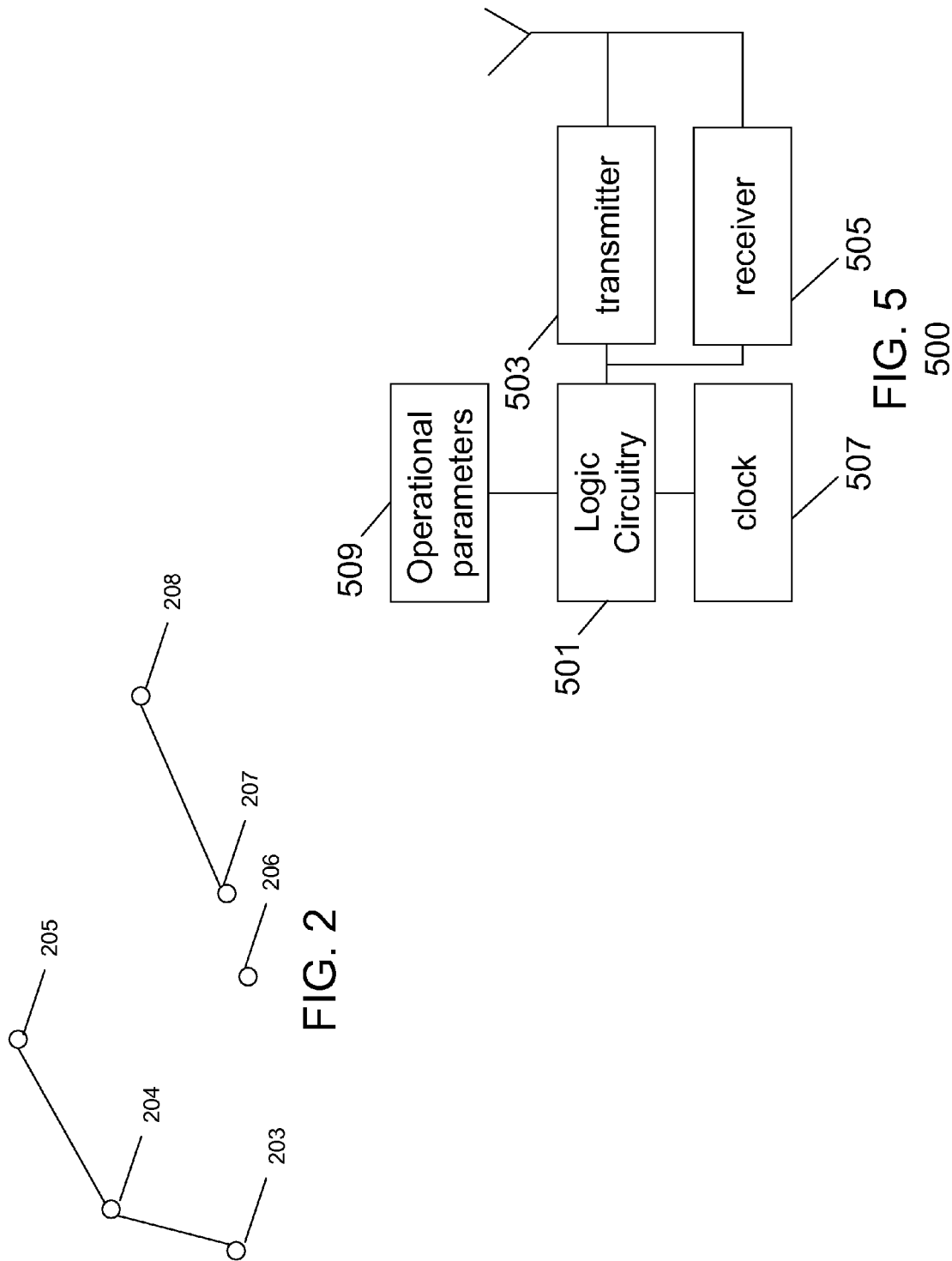
FIG. 2 is a more-detailed block diagram of the communication system of FIG. 1.

FIG. 2 is a more-detailed view of system 100, showing two coordinating nodes 205 and 208 and their associated nodes 203-204 and 207, respectively. In this illustration, nodes 203 and 204 are associated with coordinating node 205. Node 203 has all communications routed through node 204, to node 205, and ultimately to a final destination. Node 207 has all communications routed through node 208. Node 206 has yet to associate with the network. As described above, node 206, wishing to associate, will associate by scanning the proximity and discovering beacons which serves as invitation to join the network. When a node completes the network association, it begins transmitting its own beacons as a means of time synchronization and as a signal of association invitation. However, the beacons may also interfere with new network associations. For example, the beacons broadcast by nodes 203, 204, and 205 may interfere with the beacon broadcast by node 206. In order to address this issue, all nodes within communication system 100 will turn their beacons off after a time period to allow neighboring nodes to associate with them. The beacon will remain off until a time period, after which, normal beaconing resumes.

Figure 3:
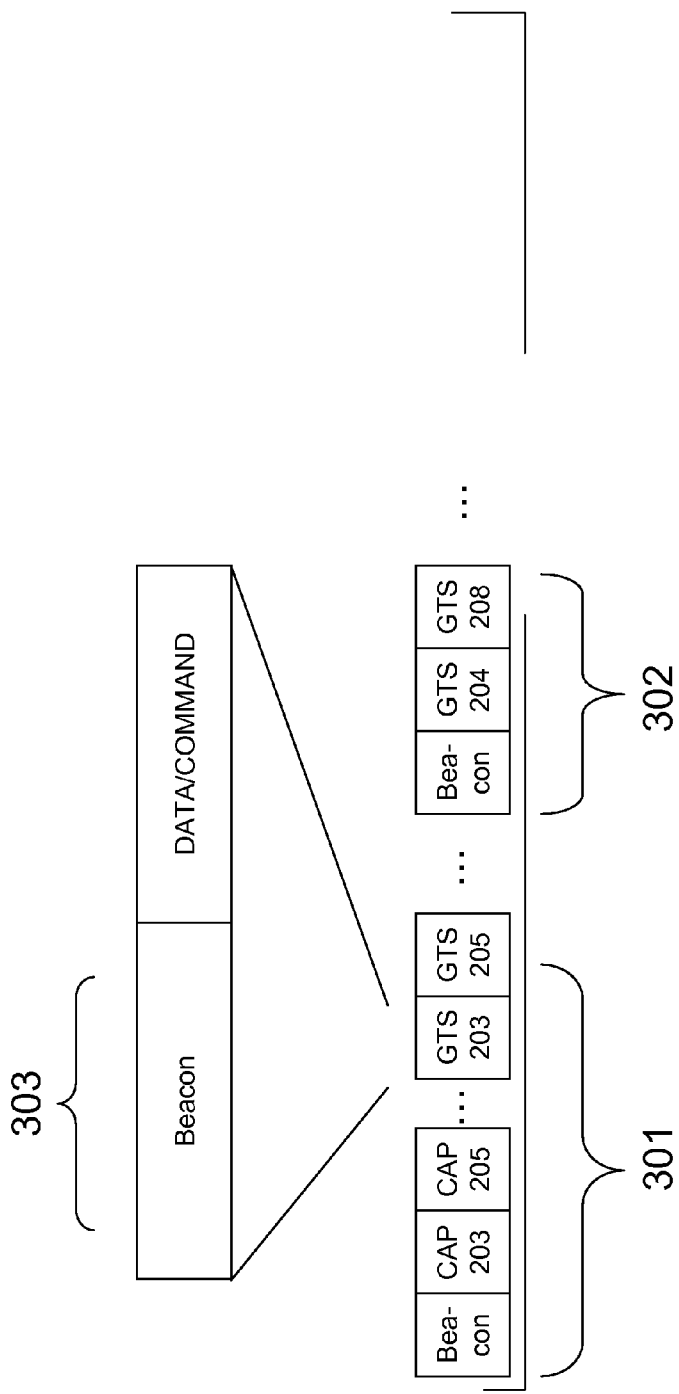
FIG. 3 illustrates a superframe structure for the communication system of FIG. 1 and FIG. 2.

FIG. 3 illustrates a superframe structure for 100. During communications among nodes, a specific transmission protocol is utilized by communication system 100 wherein each node communicates within a particular non-overlapping superframe 301, 302 as described in U.S. patent application Ser. No. 10/414,838, which is incorporated by reference herein. With reference to FIG. 2, during a superframe, a particular node will broadcast timing and control information within a beacon field, while each node (including the controller) will have a Contention Access Period (CAP) and a Contention Free Period (CFP) slot, part of the Channel Time Allocation (CTA) facility of the IEEE 802.15.3 standard, for transmission. During its guaranteed time slot, a particular node broadcasts its beacon and any command (COM) wishing to be executed to any particular node or may send data intended for a single node or set of nodes.

Figure 4:
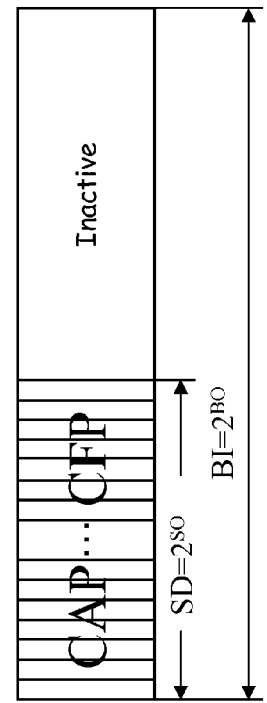
FIG. 4 is a more-detailed view of the superframe structure of FIG. 3.

The beacon interval (BI) and superframe length or duration (SD) are determined by Beacon Order (BO) and Superframe Order (SO), respectively as BI=2^(BO) where BO=0, 1, 2, ... 14 and SD=2^(SO) where SO=1,2, ... BO. The duty-cycle is defined as SD/BI. This is illustrated in FIG. 4.

During network access a node will begin scanning available channels until it hears a beacon of a potential network node (i.e., one which it can associate with). Once the beacon is heard, it sends an association request and receives an acknowledgment (ack) for the association request from the potential parent. A networked node will determine a network address/time sync information and send it out as an association response message after it receives an association request. An association response message is received from the potential parent that includes network ID and time synchronization information. The association is successful upon the node setting its own network ID and placing itself in a beacon-enabled mode.

During the association process, the association may fail due to direct interference caused by repetitive collisions that exceeds maximum number of back-off and indirect interference caused by hidden nodes. In other words, the process may fail due to transmissions by other nodes within the communication system interfering with transmissions between the node and its potential parent. In this case, the association is considered failed and the node will attempt to associate with the network again.

As discussed above, a node transmits beacons at the beginning of each superframe for a duration. In order to increase the probability that a node can associate, and in order to reduce overall system interference a node will cease transmitting its beacon for a period of time. The node will again broadcast its beacon at a time when an on-board timer expires. This period of time is estimated based on the values of known network parameters including, a total number of nodes deployed, a total coverage area, and a common transmission range and controlling parameters. In one embodiment of the present invention, the time period is estimated by the product of average node association time and a control parameter to enable a portion of neighboring nodes to be associated. At the end of this time period, the node begins transmitting its beacons again and normal data communications may proceed.

In a ad-hoc, self-organizing network, the network association is spontaneous and concurrent. However, a coordinated behavior can emerge, if an identical timer exists on each of the nodes deployed in the network. When a node is seeking network association, it scans one or more channels to discover existing networked nodes (N) within its coverage area (A). Based on the number of beacons, and/or data packets it detects, the node may establish an estimated node density function, F After the node is associated with the network and becomes a networked node, the time it starts to transmit beacons is then determined, as $T_{beacon}$ (usually $T_{beacon}$=0) At a later time, $T_{off}$, the networked node turns its beacon off. This time is equal to $T_{beacon}$ plus and offset which is the time duration allowing a portion of neighboring nodes to associate with the networked node. Thus, a node within network 100 will broadcast its beacon for a time period, allowing neighboring nodes to associate with it. The time period is based on a time period for a plurality of neighboring nodes to associate with the node. The node will then turn off it beacon at time period $T_{off}$. $T_{off}$ can be expressed as $$T_{off} = \Delta T + T_{beacon}, \qquad (1)$$

where $$\Delta T = \beta \frac{\pi R^2}{A} N \Delta \tau, \qquad (2)$$

where 0<β<1 is a numerical parameter, R a transmission range for the node, A comprises a total coverage area for the node, N is total number of nodes deployed within the coverage area A, and Δτ is an estimated association time per node. All of those parameters are global network parameters known prior to deployment.

After the networked node turns its beacon off, it remains quite, i.e. no beacons are transmitted at the beginning of each subsequent superframes for a duration of time which can be expressed by:

$$\Delta T_{off} = \alpha \Delta T, \qquad (3)$$

where 0<α<1 and ΔT is as defined in the Equation (2). At the end of $\Delta T_{off}$, the networked node will turn its beacon on again to allow normal data communications.

FIG. 5 is a block diagram of node 500. As shown, node 500 comprises transmitter 503 and receiver 505, in turn, coupled to logic circuitry 501. Operational parameters database 509 is provided to store network parameters such as β, R, A, and N. Clock 507 serves as timing means to properly time synchronize node 500. Although various forms for node 500 are envisioned, in a preferred embodiment of the present invention node 500 is formed from a Freescale Inc. MC13192 transceiver (transmitter 504 and receiver 505) coupled to a Motorola HC08 8-bit processor 501.

Figure 6:
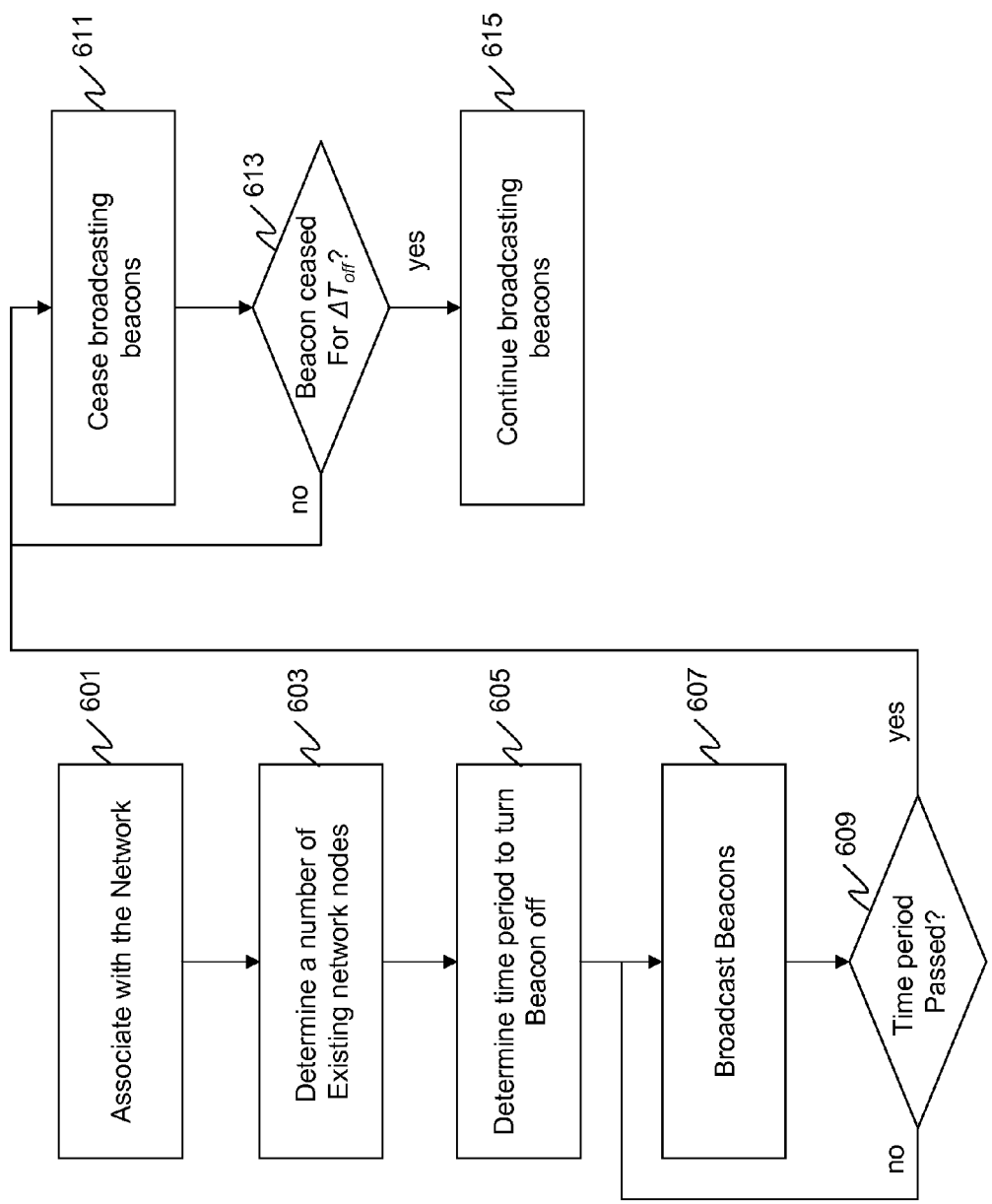
FIG. 6 is a flow chart showing operation of the node of FIG. 5.

FIG. 6 is a flow chart showing operation of the node of FIG. 5. The logic flow begins at step 601 where node 500 associates with the an ad-hoc network. At step 603 logic circuitry 501 instructs receiver 505 to scan available channels to determine a number of existing networked nodes (N) within its coverage area. More specifically, when BO is set, the time duration a device scanning channel is also fixed. Any device would only scan for 2*BO time to catch all of the beacons in its proximity (within its transmission/receiving range). However, the time duration a beacon node stays on is determined by an estimated number of neighbors, which can be derived as N/A (total number of nodes divided by the total coverage area) and multiplied by the area of transmission range. This is true for a distribution of uniform density. For other distributions, one can also get the node density estimate correspondingly. A first time period is then determined by logic circuitry 501, where the time period is equivalent to a period of time for neighboring nodes to associate with the network (step 605). As discussed above this time period is equivalent to $T_{beacon}+\Delta T$. Aditionally, ΔT is defined above in equation (2) and is based on operational parameters stored in database 509. The operational parameters comprise, but are not limited to at least one of a transmission range for node 500, a total coverage area for node 500, a total number of nodes deployed in the network, and an association time per node. Logic circuitry 501 also determines $\Delta T_{off}$ at this time.

At step 607 logic circuitry 501 instructs transmitter 503 to periodically broadcast beacons for the first period of time. At step 609 logic circuitry 501 determines if the time period has passed, and if not the logic flow returns to step 607, otherwise the logic flow continues to step 609 where beacon transmission is ceased for a second period of time. At step 611, logic circuitry 501 accesses clock 507 and determines if beacon transmission has ceased for the second time period equal to $\Delta T_{off}$, and if not, the logic flow returns to step 609, otherwise the logic flow continues to step 613 where normal network operation (beacon transmission) resumes.

The above logic flow results in transmitter 503 broadcasting a beacon for a first period of time, where the first period of time is based on a time it takes for a node to associate with the network. This time can be obtained from simulation or other means. Transmitter 503 ceases broadcasting the beacon after the first period of time has passed and again broadcasts the beacon after a second period of time has passed.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for controlling a beaconing node within communication system, the method comprising the steps of:
    associating with a network;
    determining a first period of time ($\Delta T$) to broadcast a beacon, wherein the first period of time is based upon a time it takes for a node to associate with the network;
    broadcasting the beacon for the first period of time;
    ceasing beacon broadcasts for a second period of time after the first period of time has passed; and
    periodically broadcasting the beacon after the second period of time has passed;
    wherein the first period of time ($\Delta T$) is also based upon a transmission range (R) for the node and a coverage area (A) for the node.

2. The method of claim 1 wherein the step of associating with the network comprises the step of associating with an ad-hoc network.

3. The method of claim 1 wherein the second period of time ($\Delta T_{off}$) is based on $\Delta T$.

4. The method of claim 3 wherein $$\Delta T_{off} = \alpha \Delta T,$$

where $0<\alpha<1$.

5. The method of claim 1 wherein $$\Delta T = \beta \frac{\pi R^2}{A} N \Delta \tau,$$

where $0<\beta<1$ is a numerical parameter, $\Delta \tau$ is an association time per node, and N is total number of nodes deployed in coverage area A.

6. The method of claim 1 wherein the second period of time ($\Delta T_{off}$) is based upon a transmission range (R) for the node and a coverage area (A) for the node.

7. The method of claim 1 wherein the step of periodically broadcasting the beacon comprises the step of periodically broadcasting the beacon during a beacon interval of a superframe.

8. A method comprising the steps of:
    associating with a network;
    broadcasting a beacon for a first period of time ($\Delta T$), wherein the first period of time is based on a time it takes for a node to associate with the network;
    ceasing broadcasting the beacon after the first period of time has passed; and
    again broadcasting the beacon after a second period of time has passed;
    wherein the first period of time ($\Delta T$) is also based upon a transmission range (R) for the node and a coverage area (A) for the node.

9. The method of claim 8 wherein the step of associating with the network comprises the step of associating with an ad-hoc network.

10. The method of claim 9 wherein the second period of time ($\Delta T_{off}$) is based on $\Delta T$.

11. The method of claim 10 wherein $$\Delta T_{off} = \alpha \Delta T,$$

where $0<\alpha<1$.

12. The method of claim 8 wherein $$\Delta T = \beta \frac{\pi R^2}{A} N \Delta \tau,$$

where $0<\beta<1$ is a numerical parameter, and N is total number of nodes deployed in coverage area A.

13. The method of claim 8 wherein the second period of time ($\Delta T_{off}$) is based upon a transmission range (R) for a node and a coverage area (A) for the node.

14. The method of claim 8 wherein the step of again broadcasting the beacon comprises the step of periodically broadcasting the beacon during a beacon interval of a superframe.

15. An apparatus comprising:
    a transmitter broadcasting a beacon for a first period of time ($\Delta T$), wherein the first period of time is based on a time it takes for a node to associate with the network, the transmitter ceasing broadcasting the beacon after the first period of time has passed and again broadcasting the beacon after a second period of time has passed, wherein the first period of time ($\Delta T$) is also based upon a transmission range (R) for the node and a coverage area (A) for the node.

16. The apparatus of claim 15 wherein the second period of time is based on the first period of time.

17. The apparatus of claim 15 wherein the transmitter broadcasts the beacon during a beacon interval of a superframe.

* * * * *